(12) United States Patent
Bacon et al.

(10) Patent No.: US 11,356,757 B2
(45) Date of Patent: Jun. 7, 2022

(54) INDIVIDUALLY ASSIGNABLE TRANSDUCERS TO MODULATE SOUND OUTPUT IN OPEN EAR FORM FACTOR

(71) Applicant: Bose Corporation, Framingham, MA (US)

(72) Inventors: Cedrik Bacon, Ashland, MA (US); Liam Kelly, Dorchester, MA (US); Ryan Struzik, Hopkinton, MA (US); Michael J. Daley, Shrewsbury, MA (US); Jonathan Zonenshine, Somerville, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 17/194,986

(22) Filed: Mar. 8, 2021

(65) Prior Publication Data
US 2021/0281936 A1  Sep. 9, 2021

Related U.S. Application Data

(60) Provisional application No. 62/987,040, filed on Mar. 9, 2020.

(51) Int. Cl.
*H04R 1/02* (2006.01)
*H04R 1/08* (2006.01)
*H04R 3/00* (2006.01)

(52) U.S. Cl.
CPC ............... *H04R 1/02* (2013.01); *H04R 1/08* (2013.01); *H04R 3/00* (2013.01)

(58) Field of Classification Search
CPC . H04R 1/02; H04R 1/028; H04R 1/08; H04R 3/00
See application file for complete search history.

(56) References Cited

U.S. PATENT DOCUMENTS

| 6,985,593 B2 | 1/2006 | Nichols et al. |
| 9,749,724 B2 | 8/2017 | Park |

(Continued)

OTHER PUBLICATIONS

International Search Report and the Written Opinion of the International Searching Authority, International Patent Application No. PCT/US2021/021340, pp. 1-16, dated Jun. 15, 2021.

*Primary Examiner* — Jason R Kurr
(74) *Attorney, Agent, or Firm* — Bond, Schoeneck & King, PLLC

(57) ABSTRACT

A wearable audio device including first and second transducer modules is provided. The first transducer module may include a first transducer. The first transducer module may further include a first enclosure having a top side defining a first slit and a bottom side defining a second slit. The first enclosure may be configured to guide a first sound pressure through the first slit, and a second sound pressure through the second slit. The second transducer module may include a second transducer. The second transducer module may include a second enclosure having a top side defining a third slit and a bottom side defining a fourth slit. The second enclosure may be configured to guide a third sound pressure through the third slit, and a fourth sound pressure through the fourth slit. The third and fourths slit may be arranged diagonally opposite the first and second slits, respectively.

19 Claims, 8 Drawing Sheets

(56) References Cited

U.S. PATENT DOCUMENTS

| | | | |
|---|---|---|---|
| 10,764,707 B1* | 9/2020 | Porter | H04R 5/04 |
| 2009/0310807 A1 | 12/2009 | van Halteren | |
| 2012/0215519 A1* | 8/2012 | Park | G10K 11/17854 704/2 |
| 2014/0064522 A1 | 3/2014 | Litovsky et al. | |
| 2019/0052954 A1* | 2/2019 | Rusconi Clerici Beltrami | G10K 11/26 |
| 2019/0239006 A1 | 8/2019 | Petersen et al. | |
| 2021/0211795 A1* | 7/2021 | Wang | H04R 1/04 |

* cited by examiner

Section A-A

Section B-B

INDIVIDUALLY ASSIGNABLE TRANSDUCERS TO MODULATE SOUND OUTPUT IN OPEN EAR FORM FACTOR

CROSS-REFERENCE TO RELATED APPLICATIONS

This application claims the benefit of U.S. Provisional Patent Application Ser. No. 62/987,040 filed Mar. 9, 2020 and entitled "Individually Assignable Transducers to Modulate Sound Output in Open Ear Form Factor", the entire disclosure of which is incorporated herein by reference.

BACKGROUND

This disclosure generally relates to systems and methods for arranging individually assignable transducers on wearable audio devices for improved audio output.

SUMMARY

This disclosure generally relates to systems and methods for arranging individually assignable transducers on wearable audio devices for improved audio output.

In one aspect, a wearable audio device is provided. The wearable audio device may include a multi-transducer assembly. The multi-transducer assembly may be arranged on or in the wearable audio device. The multi-transducer assembly may be configured to receive an electronic audio signal.

The multi-transducer assembly may include a first transducer module. The first transducer module may include a first dipole transducer having a first side and a second side. The first transducer module may further include a first enclosure. The first enclosure may have a top side defining a first slit and a bottom side defining a second slit. The first enclosure may include a first audio path. The first audio path may be configured to guide a first sound pressure generated by the first side of the first dipole transducer out of the first enclosure via the first slit. The first enclosure may further include a second audio path. The second audio path may be configured to guide a second sound pressure generated by the second side of the first dipole transducer out of the first enclosure via the second slit.

The multi-transducer module may include a second transducer module. The second transducer module may include a second dipole transducer having a first side and a second side. The second transducer module may include a second enclosure. The second enclosure may have a top side defining a third slit and a bottom side defining a fourth slit. The second enclosure may have a third audio path. The third audio path may be configured to guide a third sound pressure generated by the second side of the second dipole transducer out of the second enclosure via the third slit. The third slit may be arranged diagonally opposite of the first slit. The second enclosure may include a fourth audio path. The fourth audio path may be configured to guide a fourth sound pressure generated by the first side of the second dipole transducer out of the second enclosure via the fourth slit. The fourth slit may be arranged diagonally opposite the second slit.

According to an example, the multi-transducer assembly may be further configured to (1) generate a first transducer signal based on the electronic audio signal, (2) generate a second transducer signal based on the electronic audio signal, (3) provide the first transducer signal to the first dipole transducer, and (4) provide the second transducer signal to the second dipole transducer.

According to an example, the multi-transducer assembly may further include a phase shift circuit. The phase-shift circuit may be configured to phase shift the first transducer signal relative to the second transducer signal. The first transducer signal may be phase shifted 180 degrees relative to the second transducer signal.

According to an example, the first sides of the first and second dipole may each face in a first direction.

According to an example, the first and second dipole transducers may be arranged vertically relative to the wearable audio device.

According to an example, the first, second, third, and fourth slits may be defined horizontally relative to the wearable audio device.

According to an example, the first and second dipole transducers may be vertically aligned relative to a horizontal axis of the wearable audio device.

According to an example, the wearable audio device may further include a microphone configured to generate the electronic audio signal.

According to an example, the wearable audio device may be a set of audio eyeglasses. The multi-transducer assembly may be arranged on or in a temple area of the audio eyeglasses.

In another aspect, a method for generating audio via a multi-transducer assembly arranged on or in a wearable audio device is provided. The method may include receiving an electronic audio signal. The method may further include generating a first transducer signal based on the electronic audio signal. The method may further include generating a second transducer signal based on the electronic audio signal. The method may further include providing the first transducer signal to a first dipole transducer arranged in a first enclosure having a top side defining a first slit and a bottom side defining a second slit. The method may further include providing the second transducer signal to a second dipole transducer arranged in a second enclosure having a top side defining a third slit and a bottom side defining a fourth slit. The method may further include guiding, via a first audio path, a first sound pressure, generated by a first side of the first dipole transducer, out of the first enclosure via the first slit. The method may further include guiding, via a second audio path, a second sound pressure, generated by a second side of the first dipole transducer, out of the first enclosure via the second slit. The method may further include guiding, via a third audio path, a third sound pressure, generated by a second side of the second dipole transducer, out of the second enclosure, via the third slit, wherein the third slit is arranged diagonally opposite of the first slit. The method may further include guiding, via a fourth audio path, a fourth sound pressure, generated by a first side of the second dipole transducer, out of the second enclosure via the fourth slit, wherein the fourth slit is arranged diagonally opposite the second slit.

According to an example, the method may further include phase shifting the first transducer signal by 180 degrees relative to the second transducer signal.

According to an example, the method may further include amplifying the first transducer signal. The method may further include amplifying the second transducer signal. The method may further include attenuating the first transducer signal. The method may further include attenuating the second transducer signal. The method may further include frequency filtering the first transducer signal. The method may further include frequency filtering the second transducer signal.

According to an example, the method may further include generating, via a microphone, the electronic audio signal.

Other features and advantages will be apparent from the description and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various examples.

DETAILED DESCRIPTION

This disclosure generally relates to systems and methods for arranging individually assignable transducers on wearable audio devices (also referred to as "wearables") for improved audio output in a compact space. In this disclosed system, two or more dipole transducers are arranged on or within a wearable. The transducers are arranged within enclosures which convey the sound pressure generated by the transducers out of the wearable to the ears of a wearer. In a preferred embodiment, the transducers are vertically aligned relative to a horizontal axis of the wearable. In a further preferred embodiment, the transducers receive signals 180 degrees out of phase. In this embodiment, the sound pressure generated by the transducers and exiting the wearable will add together for maximized audio output, while the out of phase mechanical movements of the transducers effectively cancel out. In an ideal environment, the out of phase mechanical movement substantially eliminates mechanical feedback through the wearable. In further embodiments, the phase, amplitude, and frequency spectra of the signals applied to the transducers may be modified from this maximum output power arrangement for improved performance in a given environment.

Figure 1A:
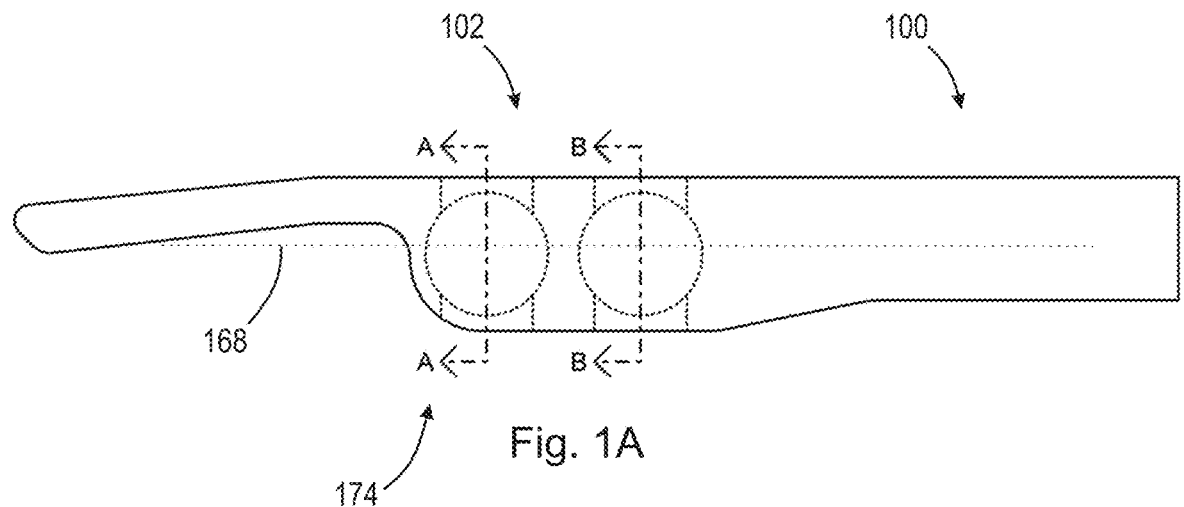
FIG. 1A is a simplified side view of the wearable audio device, according to an example of the present disclosure.
Figure 1B:
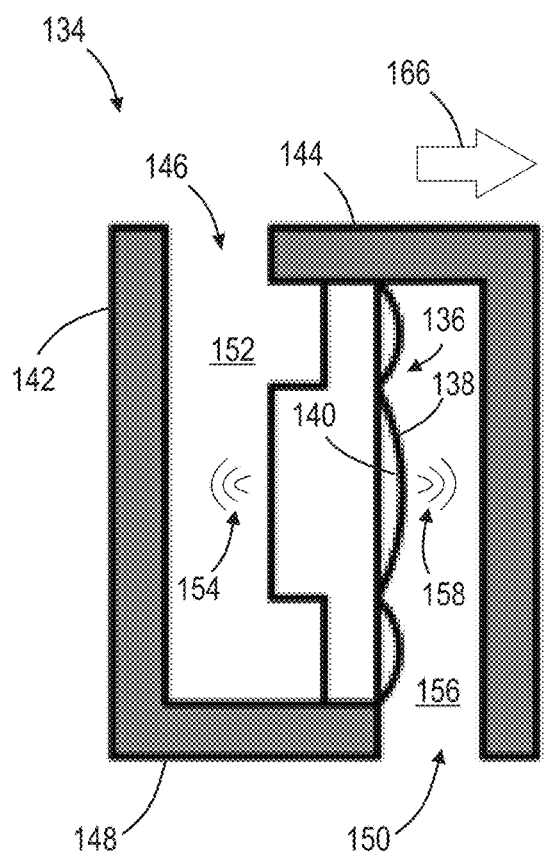
FIGS. 1B and 1C are simplified side views of the first and second transducer modules, according to an example of the present disclosure.
Figure 1C:
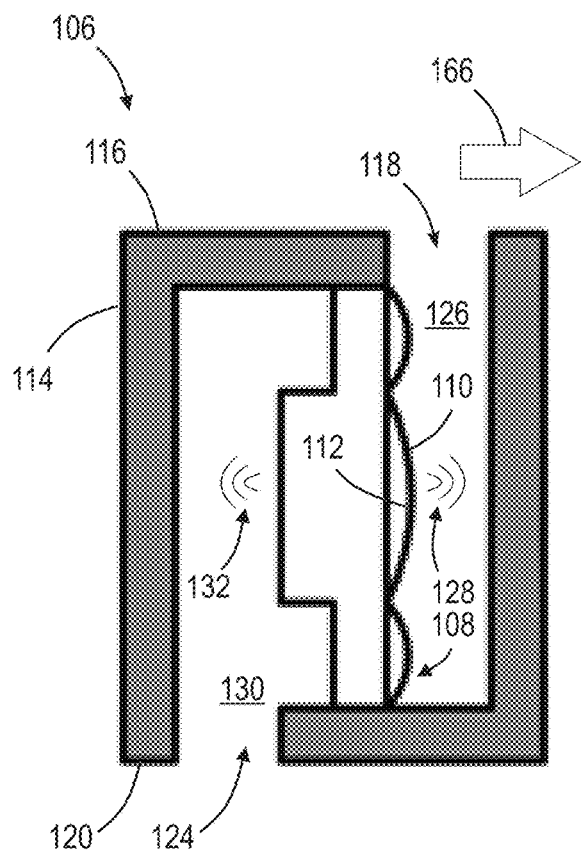
Figure 2:
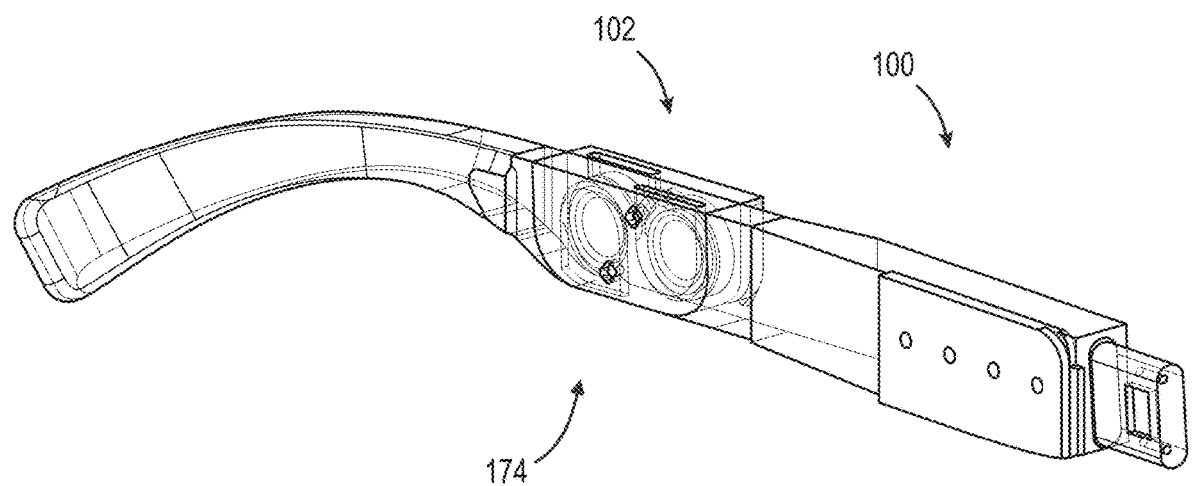
FIG. 2 is a first isometric view of a portion of the wearable audio device, according to an example of the present disclosure.
Figure 3:
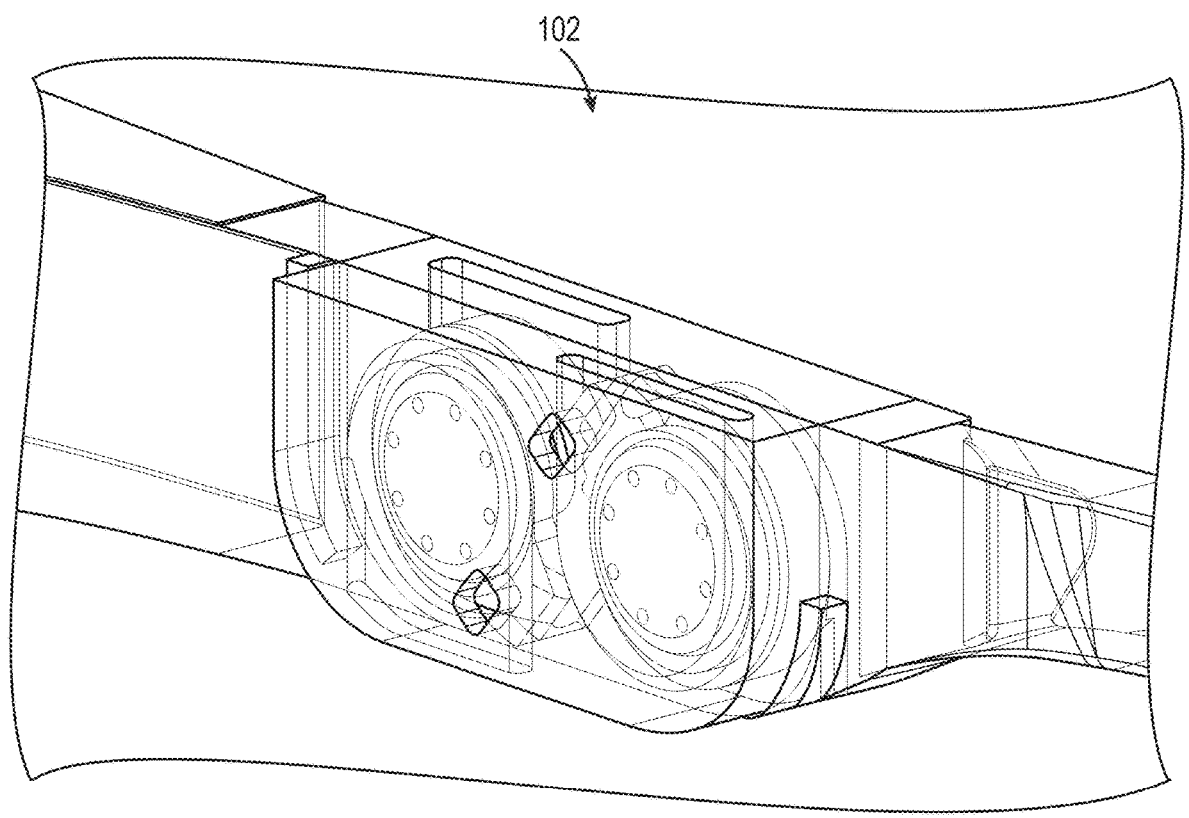
FIG. 3 is a second isometric view of a portion of the wearable audio device, according to an example of the present disclosure.

In one aspect, and with respect to FIGS. 1A-3, a wearable audio device 100 is provided. The wearable audio device 100 may include a multi-transducer assembly 102. In a preferred embodiment, the multi-transducer assembly 102 contains two transducers facing in the same direction 166. In other examples, the multi-transducer assembly 102 may contain more than two transducers. As shown in FIGS. 2 and 3, the multi-transducer assembly 102 may be arranged on or in the wearable audio device 100.

According to an example, and as shown in FIGS. 1A, 2, and 3, the wearable audio device 100 may be a set of audio eyeglasses. The multi-transducer assembly may be arranged on or in a temple area 174 of the audio eyeglasses. In a further example, the audio eyeglasses may include one or more multi-transducer assemblies 102 on each temple area 174.

Figure 4:
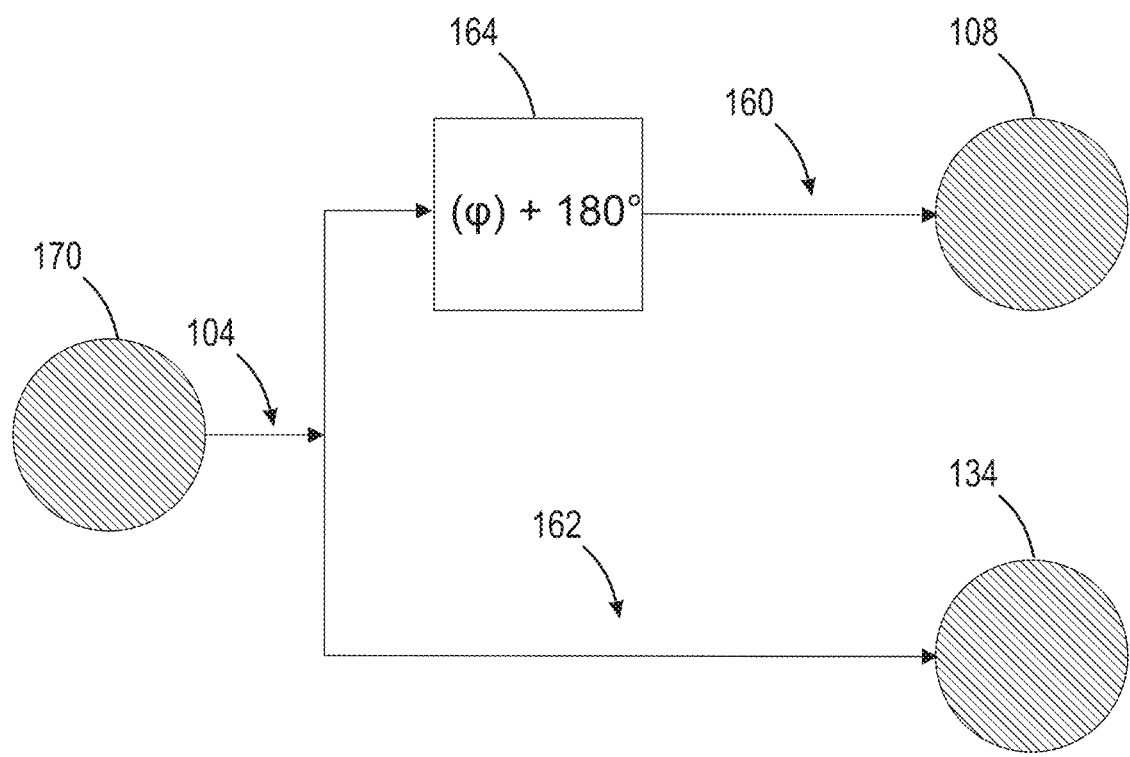
FIG. 4 is a simplified signal processing schematic, according to an example of the present disclosure.

The multi-transducer assembly 102 may be configured to receive an electronic audio signal 104. According to an example, and as shown in FIG. 4, the wearable audio device 100 may further include a microphone 170 configured to generate the electronic audio signal 104. The microphone 170 may be positioned proximate to one or more rims of the audio eyeglasses so as to capture audio to convey to the wearer. In other example, the electronic audio signal 104 may be received from other wired or wireless sources, such as a smartphone, radio, tablet, personal computer, etc., via any practical protocol or reception method.

The term "wearable audio device", as used in this application, is intended to mean a device that fits around, on, in, or near an ear (including open-ear audio devices worn on the head or shoulders of a user) and that radiates acoustic energy into or towards the ear. Wearable audio devices are sometimes referred to as audio eyeglasses, headphones, earphones, earpieces, headsets, earbuds or sport headphones, and can be wired or wireless. A wearable audio device includes an acoustic driver to transduce audio signals to acoustic energy. The acoustic driver may be housed in an earcup. While some of the figures and descriptions following may show a single wearable audio device, having a pair of earcups (each including an acoustic driver) it should be appreciated that a wearable audio device may be a single stand-alone unit having only one earcup. Each earcup of the wearable audio device may be connected mechanically to another earcup or headphone, for example by a headband and/or by leads that conduct audio signals to an acoustic driver in the ear cup or headphone. A wearable audio device may include components for wirelessly receiving audio signals. A wearable audio device may include components of an active noise reduction (ANR) system. Wearable audio devices may also include other functionality such as a microphone so that they can function as a headset. While FIGS. 1A, 2, and 3 show an example of an audio eyeglasses form factor, in other examples the headset may be an in-ear, on-ear, around-ear, or near-ear headset. In some examples, a wearable audio device may be an open-ear device that includes an acoustic driver to radiate acoustic energy towards the ear while leaving the ear open to its environment and surroundings.

The multi-transducer assembly 104 may include a first transducer module 106. A simplified side view of the first transducer module 106 is shown in FIG. 1C. The first transducer module 106 may include a first dipole transducer 108 having a membrane with a first side 110 and a second side 112. As an electrical signal is applied to the transducer 108, the membrane will flex to generate a positive sound pressure on one side, and a negative sound pressure of equal power on the other.

As further shown in FIG. 1C, the first transducer module 106 may further include a first enclosure 114. The first dipole transducer 108 may be positioned within the first enclosure 114. The first enclosure 114 may have a top side 116 defining a first slit 118 and a bottom side 120 defining a second slit 124. In further examples, the slits 118, 124 may be an opening of any reasonable shape practical for emitting sound. The shape of the opening may be designed and verified through simulation and measurement. The top side 116 and bottom side 120 may correspond to a top side and bottom side of the wearable audio device 100.

The first enclosure 114 may include a first audio path 126. The first audio path 126 may be configured to guide a first sound pressure 128 generated by the first side 110 of the membrane of the first dipole transducer 108 out of the first enclosure 114 via the first slit 118. The first enclosure 114 may further include a second audio path 130. The second audio path 130 may be configured to guide a second sound pressure 132 generated by the second side 112 of the membrane of the first dipole transducer 108 out of the first enclosure 114 via the second slit 124. The first 126 and second 130 audio paths may be a tubular, cylindrical, or otherwise hollow portion of the first enclosure in sonic communication with the first 110 and second 112 sides of the membrane of the transducer 108, respectively.

The multi-transducer module 102 may include a second transducer module 134. A simplified side view of the second transducer module 134 is shown in FIG. 1B. As shown in FIGS. 1B and 1C, and as will be explained below, the second transducer module 134 is nearly identical to the first transducer module 106 of FIG. 1C, with the exception of a rotated enclosure relative to the transducer. Like the first module 106, the second transducer module 134 may include a second dipole transducer 136 having a first side 138 and a second side 140.

The second transducer module 134 may include a second enclosure 142. As shown in FIGS. 1B and 1C, the second enclosure 142 is, relative to the surrounded transducer 136, substantially a mirror image of the first enclosure 114. The second enclosure 142 may have a top side 144 defining a third slit 146 and a bottom side 148 defining a fourth slit 150. In further examples, the slits 146, 150 may be an opening of any reasonable shape practical for emitting sound. The shape of the opening may be designed and verified through simulation and measurement. The top side 144 and bottom side 148 may correspond to a top side and bottom side of the wearable audio device 100, as well as the top side 116 and the bottom side 120 of the first enclosure 114.

The second enclosure 142 may have a third audio path 152. The third audio path 152 may be configured to guide a third sound pressure 154 generated by the second side 140 of a membrane of the second dipole transducer 136 out of the second enclosure 142 via the third slit 146. The third slit 146 may be arranged diagonally opposite of the first slit 118. The second enclosure 142 may include a fourth audio path 156. The fourth audio path 156 may be configured to guide a fourth sound pressure 158 generated by the first side 138 of the second dipole transducer 136 out of the second enclosure 142 via the fourth slit 150. The fourth slit 150 may be arranged diagonally opposite the second slit 124. The third 146 and fourth 156 audio paths may be tubular, cylindrical, or otherwise hollow portion of the second enclosure 142 in sonic communication with the first 138 and second 140 sides of the membrane of the transducer 136, respectively.

According to an example, and as shown in FIG. 4, the multi-transducer assembly 102 may be further configured to generate a first transducer signal 160 and a second transducer signal 162 based on the electronic audio signal 104. As described above, the electronic audio signal 104 may originate from a microphone 170 arranged on the wearable 100.

The circuitry of the wearable is then configured to, via any practical components and methods, split the electronic audio signal 104 into the first 160 and second 162 transducer signals. The multi-transducer assembly 102 may be further configured to provide the first transducer signal 160 to the first dipole transducer 108, and to provide the second transducer signal 162 to the second dipole transducer 134. Upon receiving the signals, the first 108 and second 134 transducers generate sound pressures 128, 132, 154, 158 according to those signals. This sound pressure will travel out of the first 114 and second 142 enclosures via the aforementioned audio paths, and, depending on the qualities of the audio, be heard by the wearer of the wearable audio device 100.

According to an example, the multi-transducer assembly 102 may further include a phase shift circuit 164. The phase-shift circuit 164 may be configured to phase shift the first transducer signal 160 relative to the second transducer signal 162. In a preferred embodiment, the first transducer signal 160 may be phase shifted 180 degrees relative to the second transducer signal 162. The 180 phase shift may lead to two important results. First, it will cause the first 128 and third 154 sound pressures to have the same phase. Thus, once the first 128 and third 154 sound pressures exit the first 114 and second 142 enclosures above the wearable 100, the sound pressures will add together, rather than cancel out. Similarly, the second 132 and fourth 158 sound pressures will also have the same phase. Thus, once the second 132 and fourth 158 sound pressures exit the first 114 and second 142 enclosures below the wearable 100, these sound pressures will also add together. Further, by supplying the dipole transducers 108, 136 signals 180 degrees out of phase, the membranes of the transducers 108, 136 will accordingly move opposite of each other. If the amplitude of the first and second transducer signals 160, 162 are equal, then the movements of their associated membranes will be equal and opposite, essentially cancelling each other out. Accordingly, this preferred arrangement both maximizes total audio output of the wearable audio device 100 while minimizing physical feedback.

In a preferred embodiment, the phase shift circuit 164 may be configured such that one of the dipole transducers 108, 134 may be wired in reverse polarity relative to the other. For example, the electronic audio signal 104 may be transmitted by a device, such as an amplifier, with a positive terminal and a negative terminal. The dipole transducers 108, 134 may also have positive and negative terminals. To achieve the 180 degree relative phase shift, the positive and negative terminals of the first dipole transducer 108 may be electrically coupled to the corresponding positive and negative terminals of the transmitting device. However, the positive terminal of the second dipole transducer 134 may then be connected to the negative terminal of the transmitting device, while the negative terminal of the second dipole transducer 134 may be connected to the positive terminal of the transmitting device. Reversing the polarity of one of the transducers 108, 134 relative to the other may be one of the most direct ways to achieve the desired 180 degree phase shift.

Figure 6:
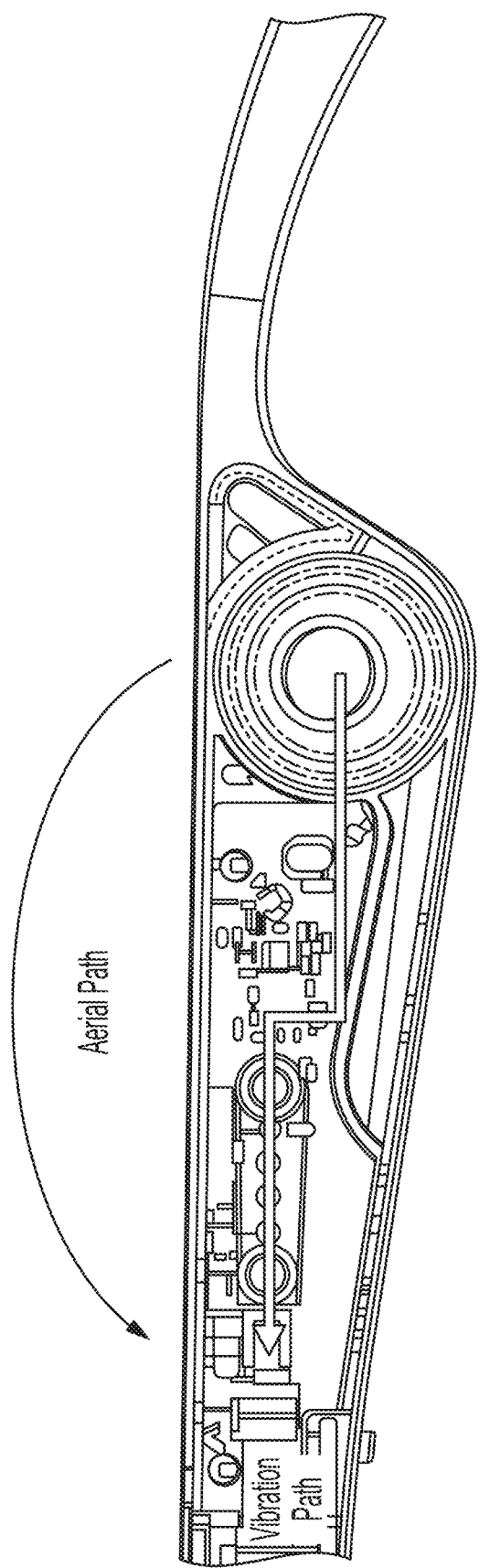
FIG. 6 is an internal mechanical layout demonstrating feedback paths in a wearable audio device, according to an example.

FIG. 6 illustrates how the audio and/or mechanical vibrational movements generated by the membranes of the transducers 108, 136, shown in FIGS. 1B and 1C, may cause feedback through the audio and mechanical paths. In FIG. 6, the "vibration path" represents the mechanical vibrational movements which travel through the body of the wearable 100 and cause the microphone 170 to similarly vibrate, while the "aerial path" represents the audio emitted by the transducers 108, 136 which may be picked up by the microphone 170.

Figure 5:
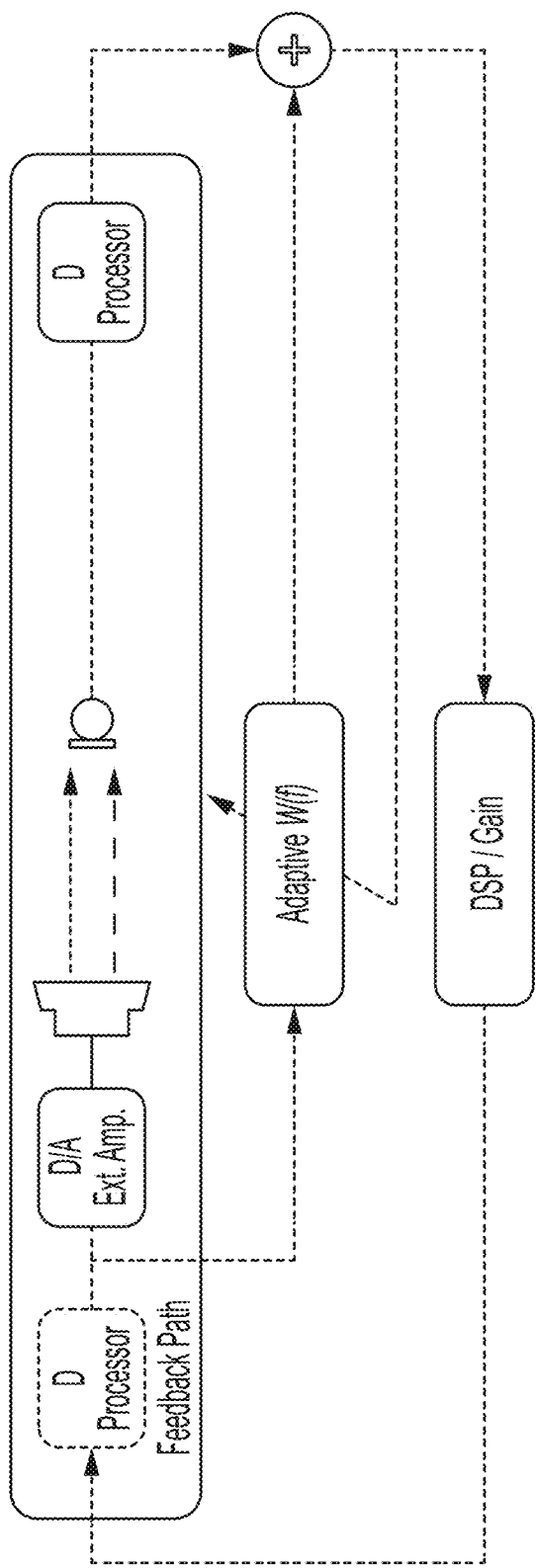
FIG. 5 is a simplified schematic of an audio system with adaptive filtering to minimize feedback, according to an example.

In other examples where maximized audio output is not required, the first 160 and/or second 162 transducer signals may be amplified, attenuated, frequency filtered, or phase shifted to improve other aspects of the output audio, including gain relative to the audio received from the microphone 170. The settings for the components implementing the amplification, attenuation, frequency filtering, or phase shifting may be set during manufacture, or they may be programmed during use via a controller. As shown in FIG. 5, adaptive filtering may be used in conjunction with digital signal processing algorithms and/or the aforementioned components to suppress mechanical and/or audio frequencies prone to feedback.

According to an example, the first sides 110, and 138 of the first 108 and second 136 dipole transducers may each face in a first direction 166. An example of the first direction 166 is shown by the arrows in FIGS. 1B and 1C. Orienting the transducers in this manner allows for preferred 180 degrees out-of-phase implementation described above.

According to an example, the first 108 and second 136 dipole transducers may be arranged vertically relative to the wearable audio device 100. According to a further example, and as shown in FIG. 1A, the first 108 and second 136 dipole transducers may be vertically aligned relative to a horizontal axis 168 of the wearable audio device 100. In an alternative example, the first and second 108, 136 transducers may be arranged such that their membranes, and the respective motion axes of their membranes, are coaxial, e.g., arranged back-to-back with each other. In a further alternative example, the transducers 108, 136 may be arranged in a vertically stack alignment, such that their membranes are aligned relative to a vertical axis of the wearable audio device. In a further alternative example, the membranes of the transducers 108, 136 may be facing in opposite directions, such that the first transducer 108 faces outward from the head of the user, while the second transducer 136 faces inward towards the head. These alternative examples may require further corresponding structural modifications to the features of the wearable audio device 100, such as the enclosures 114, 142, the audio paths 126, 130, 152, 156, and the slits 118, 124, 146, 150. These alternative embodiments may also require further signal processing modifications, such as modifications to the phase of the electronic audio signal 104 and the signals derived therefrom. The transducers 108, 136 may be arranged in any other manner practical to optimize the audio output while minimizing mechanical feedback within the wearable audio device 100.

According to an example, the first 118, second 124, third 146, and fourth 150 slits may be defined horizontally relative to the wearable audio device 100. The slits 118, 124, 146, 150 may be arranged in any other manner practical to optimize the audio output while minimizing mechanical feedback within the wearable audio device 100.

Figure 7:
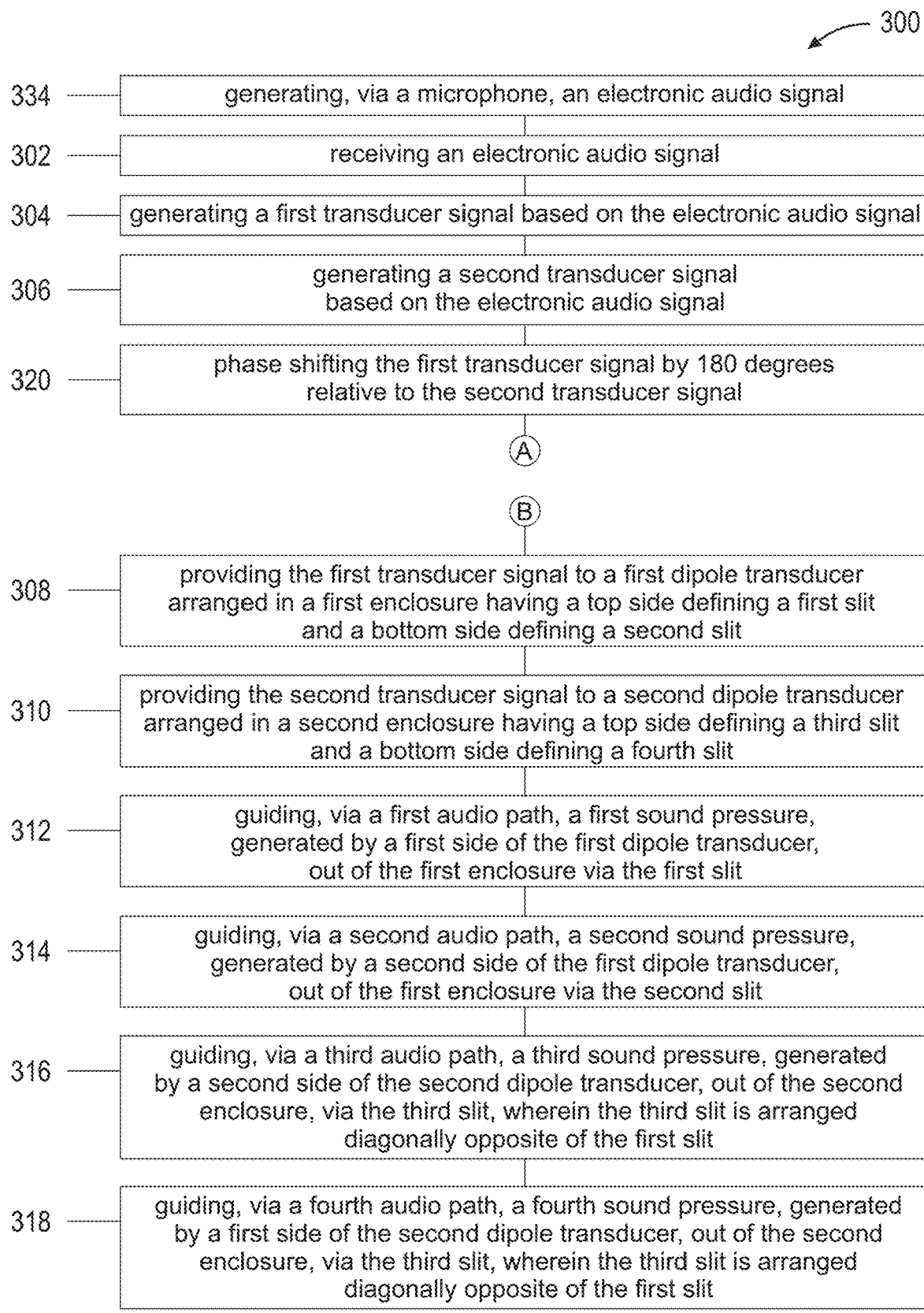
FIG. 7 is a flowchart illustrating the steps of a method, according to an example of the present disclosure.
Figure 8:
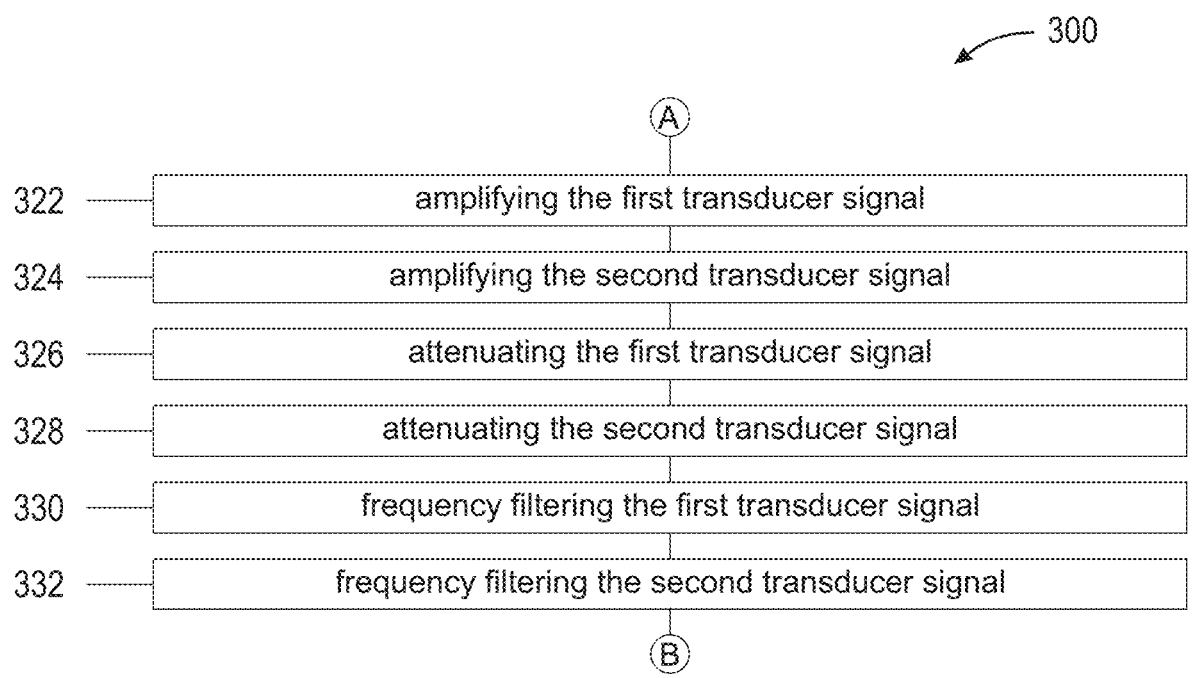
FIG. 8 is a flowchart illustrating additional steps of the method, according to an example of the present disclosure.

In another aspect, and with reference to FIGS. 7 and 8, a method 300 for generating audio via a multi-transducer assembly arranged on or in a wearable audio device is provided. The method 300 may include receiving 302 an electronic audio signal. The method 300 may further include generating 304 a first transducer signal based on the electronic audio signal. The method 300 may further include generating 306 a second transducer signal based on the electronic audio signal. The method 300 may further include providing 308 the first transducer signal to a first dipole transducer arranged in a first enclosure having a top side defining a first slit and a bottom side defining a second slit. The method 300 may further include providing 310 the second transducer signal to a second dipole transducer arranged in a second enclosure having a top side defining a third slit and a bottom side defining a fourth slit. The method 300 may further include guiding 312, via a first audio path, a first sound pressure, generated by a first side of the first dipole transducer, out of the first enclosure via the first slit. The method 300 may further include guiding 314, via a second audio path, a second sound pressure, generated by a second side of the first dipole transducer, out of the first enclosure via the second slit. The method 300 may further include guiding 316, via a third audio path, a third sound pressure, generated by a second side of the second dipole transducer, out of the second enclosure, via the third slit, wherein the third slit is arranged diagonally opposite of the first slit. The method 300 may further include guiding 318, via a fourth audio path, a fourth sound pressure, generated by a first side of the second dipole transducer, out of the second enclosure via the fourth slit, wherein the fourth slit is arranged diagonally opposite the second slit.

According to an example, the method 300 may further include phase shifting 320 the first transducer signal by 180 degrees relative to the second transducer signal.

According to an example, the method 300 may further include amplifying 322 the first transducer signal. The method 300 may further include amplifying 324 the second transducer signal. The method 300 may further include attenuating 326 the first transducer signal. The method 300 may further include attenuating 328 the second transducer signal. The method 300 may further include frequency filtering 330 the first transducer signal. The method 300 may further include frequency filtering 332 the second transducer signal. In a further example, the first transducer signal may be filtered, phase shifted, or otherwise processed to drive the first transducer to generate a first sound pressure designed to cancel out a second sound pressure proximate to a microphone, wherein the second sound pressure may be generated by the second transducer. Proximate to the microphone, the first sound pressure may be of equal amplitude and 180 degrees out of phase relative to the second sound pressure.

According to an example, the method 300 may further include generating 334, via a microphone, the electronic audio signal.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A wearable audio device, comprising:
   a multi-transducer assembly arranged on or in the wearable audio device and configured to receive an electronic audio signal, comprising:
   a first transducer module, comprising:
   a first dipole transducer having a first side and a second side, and
   a first enclosure having a top side defining a first slit and a bottom side defining a second slit, comprising:
   a first audio path configured to guide a first sound pressure generated by the first side of the first dipole transducer out of the first enclosure via the first slit; and
   a second audio path configured to guide a second sound pressure generated by the second side of the first dipole transducer out of the first enclosure via the second slit; and
   a second transducer module, comprising:
   a second dipole transducer having a first side and a second side, wherein the first side of the second dipole transducer faces the same direction as the first side of the first dipole transducer, and
   a second enclosure having a top side defining a third slit and a bottom side defining a fourth slit, comprising:
   a third audio path configured to guide a third sound pressure generated by the second side of the second dipole transducer out of the second enclosure via the third slit; and
   a fourth audio path configured to guide a fourth sound pressure generated by the first side of the second dipole transducer out of the second enclosure via the fourth slit.

2. The wearable audio device of claim 1, wherein the multi-transducer assembly is further configured to:
   generate a first transducer signal based on the electronic audio signal;
   generate a second transducer signal based on the electronic audio signal;
   provide the first transducer signal to the first dipole transducer; and
   provide the second transducer signal to the second dipole transducer.

3. The wearable audio device of claim 2, wherein the multi-transducer assembly further comprises a phase shift circuit configured to phase shift the first transducer signal relative to the second transducer signal.

4. The wearable audio device of claim 3, wherein first transducer signal is phase shifted 180 degrees relative to the second transducer signal.

5. The wearable audio device of claim 1, wherein the first and second dipole transducers are arranged vertically relative to the wearable audio device.

6. The wearable audio device of claim 1, wherein the first, second, third, and fourth slits are defined horizontally relative to the wearable audio device.

7. The wearable audio device of claim 1, wherein the first and second dipole transducers are vertically aligned relative to a horizontal axis of the wearable audio device.

8. The wearable audio device of claim 1, further comprising a microphone configured to generate the electronic audio signal.

9. The wearable audio device of claim 8, wherein the multi-transducer assembly is arranged on or in a temple area of the audio eyeglasses.

10. The wearable audio device of claim 1, wherein the wearable audio device is a set of audio eyeglasses.

11. A method for generating audio via a multi-transducer assembly arranged on or in a wearable audio device, comprising:
receiving an electronic audio signal;
generating a first transducer signal based on the electronic audio signal;
generating a second transducer signal based on the electronic audio signal;
providing the first transducer signal to a first dipole transducer arranged in a first enclosure having a top side defining a first slit and a bottom side defining a second slit;
providing the second transducer signal to a second dipole transducer arranged in a second enclosure having a top side defining a third slit and a bottom side defining a fourth slit;
guiding, via a first audio path, a first sound pressure, generated by a first side of the first dipole transducer, out of the first enclosure via the first slit;
guiding, via a second audio path, a second sound pressure, generated by a second side of the first dipole transducer, out of the first enclosure via the second slit;
guiding, via a third audio path, a third sound pressure, generated by a second side of the second dipole transducer, out of the second enclosure, via the third slit; and
guiding, via a fourth audio path, a fourth sound pressure, generated by a first side of the second dipole transducer, out of the second enclosure via the fourth slit, wherein the first side of the second dipole transducer faces the same direction as the first side of the first dipole transducer.

12. The method of claim 11, further comprising phase shifting the first transducer signal by 180 degrees relative to the second transducer signal.

13. The method of claim 11, further comprising amplifying the first transducer signal.

14. The method of claim 11, further comprising amplifying the second transducer signal.

15. The method of claim 11, further comprising attenuating the first transducer signal.

16. The method of claim 11, further comprising attenuating the second transducer signal.

17. The method of claim 11, further comprising frequency filtering the first transducer signal.

18. The method of claim 11, further comprising frequency filtering the second transducer signal.

19. The method of claim 11, further comprising generating, via a microphone, the electronic audio signal.

* * * * *